United States Patent
Baker

(10) Patent No.: US 9,730,385 B2
(45) Date of Patent: Aug. 15, 2017

(54) DRIVE SYSTEM FOR WALK BEHIND MOWER

(71) Applicant: HUSQVARNA AB, Huskvarna (SE)

(72) Inventor: David J. Baker, Fort Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/774,281

(22) PCT Filed: Mar. 14, 2013

(86) PCT No.: PCT/US2013/031570
§ 371 (c)(1),
(2) Date: Sep. 10, 2015

(87) PCT Pub. No.: WO2014/142905
PCT Pub. Date: Sep. 18, 2014

(65) Prior Publication Data
US 2016/0029557 A1 Feb. 4, 2016

(51) Int. Cl.
*A01D 69/06* (2006.01)
*A01D 34/69* (2006.01)
*A01D 34/68* (2006.01)
*A01D 34/82* (2006.01)

(52) U.S. Cl.
CPC ......... *A01D 34/69* (2013.01); *A01D 34/6806* (2013.01); *A01D 34/6812* (2013.01); *A01D 34/824* (2013.01); *A01D 2034/6837* (2013.01)

(58) Field of Classification Search
CPC . A01D 34/69; A01D 34/6812; A01D 34/6806
USPC ................................................. 56/11.6, 11.4
See application file for complete search history.

(56) References Cited

U.S. PATENT DOCUMENTS

| | | | |
|---|---|---|---|
| 2,718,154 A | 9/1955 | Mathson | |
| 2,771,730 A * | 11/1956 | True | A01D 34/04 56/11.6 |
| 3,367,459 A * | 2/1968 | Rubin | A01D 34/6812 192/224.1 |
| 4,058,957 A | 11/1977 | Roseberry | |
| 4,117,652 A * | 10/1978 | Jones | A01D 34/69 180/19.1 |
| 4,213,288 A * | 7/1980 | Takeuchi | A01D 34/6812 192/224.1 |
| 4,214,641 A * | 7/1980 | Hauser | A01D 34/69 180/19.1 |
| 4,231,215 A | 11/1980 | Klas | |

(Continued)

OTHER PUBLICATIONS

International Search Report & Written Opinion in International Patent Application No. PCT/US2013/031570, mailed May 28, 2013.

(Continued)

*Primary Examiner* — Árpád Fábián-Kovács
(74) *Attorney, Agent, or Firm* — McNair Law Firm, P.A.

(57) ABSTRACT

A drive system of a lawn mower includes a drive belt, a drive pulley, a drive shaft pulley and an idler pulley. The drive pulley is disposed at a rocking transmission of the lawn mower to transfer drive belt motion to power for a set of wheels of the lawn mower via the rocking transmission when the rocking transmission is engaged. The drive shaft pulley is operably coupled to a drive shaft of the lawn mower to rotate responsive to rotation of the drive shaft. The drive shaft pulley engages the drive belt responsive to engagement of the rocking transmission.

20 Claims, 4 Drawing Sheets

(56) References Cited

U.S. PATENT DOCUMENTS

| | | | | |
|---|---|---|---|---|
| 4,408,683 A * | 10/1983 | Elmy | ............... | B60W 10/18 |
| | | | | 192/219.6 |
| 4,896,487 A * | 1/1990 | Hikishima | ............ | A01D 34/69 |
| | | | | 180/19.1 |
| 5,274,987 A | 1/1994 | Wiener | | |
| 5,718,105 A * | 2/1998 | Irikura | ............... | A01D 34/69 |
| | | | | 180/19.1 |
| 5,873,287 A * | 2/1999 | Kawada | ............. | A01D 34/69 |
| | | | | 475/83 |
| 5,887,484 A * | 3/1999 | Abend | ............... | A01D 34/69 |
| | | | | 180/19.1 |
| 6,082,083 A | 7/2000 | Stalpes et al. | | |
| 6,131,380 A | 10/2000 | Browning | | |
| 7,275,355 B2 * | 10/2007 | Adams | ............... | A01D 34/78 |
| | | | | 56/10.2 G |
| 7,850,555 B2 * | 12/2010 | Keane | ............... | A01D 69/08 |
| | | | | 474/11 |
| 8,226,508 B2 * | 7/2012 | Osborne | ........... | A01D 34/6806 |
| | | | | 474/101 |
| 2002/0178708 A1 * | 12/2002 | Williams | ............ | A01D 34/69 |
| | | | | 56/10.8 |
| 2015/0113932 A1 * | 4/2015 | Helgesen | ............ | A01D 34/69 |
| | | | | 56/11.8 |

OTHER PUBLICATIONS

International Preliminary Report on Patentability in International Patent Application No. PCT/US2013/031570 issued Sep. 15, 2015.

* cited by examiner

DRIVE SYSTEM FOR WALK BEHIND MOWER

TECHNICAL FIELD

Example embodiments generally relate to outdoor power equipment and, more particularly, relate to a walk behind lawn mower with a belt drive system that employs a rocking transmission.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically relatively compact, have comparatively small engines and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers and/or the like) in addition to grass cutting components. Riding lawn mowers can also be ruggedly built and have sufficient power, traction, and handling capabilities to enable operators to mow over rough terrain, if needed.

Walk behind models are often used when smaller lots or tighter areas are to be mowed. Some, relatively simple walk behind models may move responsive only to the pushing force provided by the operator. However, other models may provide power to the wheels to assist the operator relative to providing mobility for the lawn mower. In many instances, the lawn mower may have power provided to either the front set of wheels, or the back set of wheels. The power may be provided, for example, via a belt system that is selectively powered off the same shaft that turns a blade for cutting grass.

In some cases, a rocking transmission (which rocks around the axle of the corresponding set of wheels that is to be selectively powered) may be used to provide power from the shaft that turns the blade to at least one of the sets of wheels. A drive system employing such a rocking transmission may require relatively high force to prevent belt slippage. Moreover, high amounts of tension may be felt by the operator in new models of mowers employing the drive system when the operator attempts to operate the transmission using triggers at the handle assembly of the mower.

BRIEF SUMMARY OF SOME EXAMPLES

Some example embodiments may therefore provide for improved performance of a drive system that employs a rocking transmission. In this regard, for example, some embodiments may be provided to increase the amount of contact between the belt and the engine pulley and drive pulley so that more power can be transferred from the engine pulley to the wheels when the transmission is engaged. In some embodiments, an idler pulley may be placed proximate to the engine pulley and at least partially in between the rocking transmission (and its corresponding drive pulley) and the engine pulley (which may be referred to alternatively as a drive shaft pulley) to increase the amount of belt wrap around the engine pulley and the drive pulley. Whereas a typical drive system may provide about 180 degrees of belt wrap (or less) around the pulleys, some example embodiments may provide at least 190 degrees of belt wrap on each pulley and perhaps more than 200 on the engine pulley.

In one example embodiment, a drive system of a lawn mower is provided. The drive system may include a drive belt, a drive pulley, a drive shaft pulley and an idler pulley. The drive pulley may be disposed at a rocking transmission of the lawn mower to transfer drive belt motion to power for a set of wheels of the lawn mower via the rocking transmission when the rocking transmission is engaged. The drive shaft pulley may be operably coupled to a drive shaft of the lawn mower to rotate responsive to rotation of the drive shaft. The drive shaft pulley may engage the drive belt responsive to engagement of the rocking transmission. The idler pulley may be disposed substantially between the drive pulley and the drive shaft pulley to engage the drive belt and result in belt wrap around the drive shaft pulley of greater than about 200 degrees and result in belt wrap around the drive pulley of greater than about 190 degrees.

In another example embodiment, a lawn mower is provided. The lawn mower may include a blade housing, an engine supported at least in part by the blade housing to selectively rotate a drive shaft, a mobility assembly and a drive system. The drive system may include a drive belt, a drive pulley, a drive shaft pulley and an idler pulley. The drive pulley may be disposed at a rocking transmission of the lawn mower to transfer drive belt motion to power for a set of wheels of the lawn mower via the rocking transmission when the rocking transmission is engaged. The drive shaft pulley may be operably coupled to a drive shaft of the lawn mower to rotate responsive to rotation of the drive shaft. The drive shaft pulley may engage the drive belt responsive to engagement of the rocking transmission. The idler pulley may be disposed substantially between the drive pulley and the drive shaft pulley to engage the drive belt and result in belt wrap around the drive shaft pulley of greater than about 200 degrees and result in belt wrap around the drive pulley of greater than 190 degrees.

Some example embodiments may provide for improved power to be delivered to the drive wheels of a walk behind mower employing a rocking transmission.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
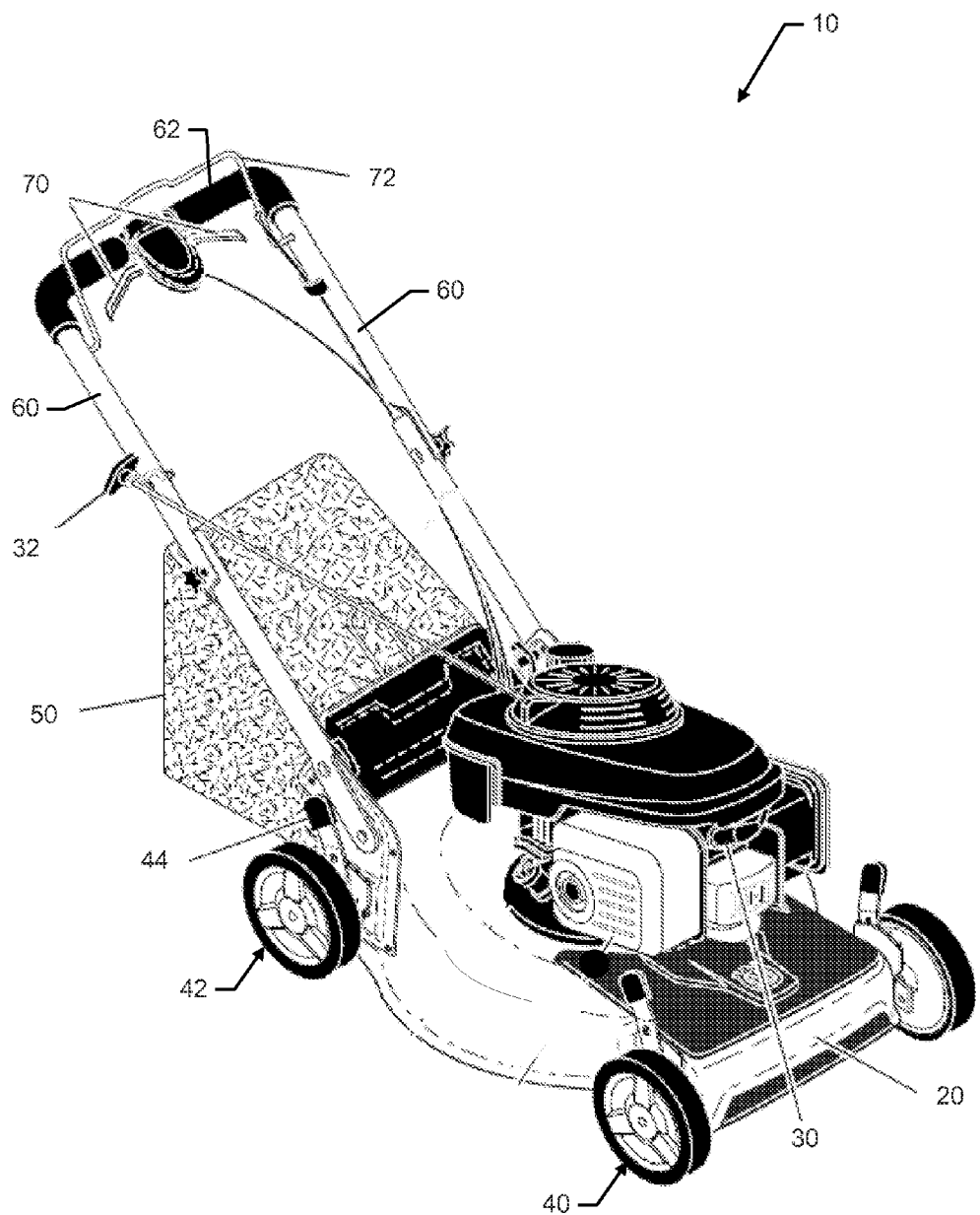
FIG. 1 illustrates a perspective view of a walk-behind lawn mower according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure.

Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein provide structures for improved drive system performance on a walk-behind lawn mower. In this regard, some embodiments may provide for the provision of an idler pulley proximate to the engine pulley and at least in part between the engine pulley and a rocking transmission of the mower. The idler pulley may be positioned such that it increases the belt wrap around the engine pulley to greater than about 200 degrees and increases belt wrap around the drive pulley at the rocking transmission to greater than about 190 degrees. Other structural features described herein may further enhance the performance and reliability of the drive system as described in greater detail below.

FIG. 1 illustrates a perspective view of a walk-behind lawn mower 10 of an example embodiment. The lawn mower 10 of FIG. 1 includes a blade housing 20 that may house a rotatable cutting blade (not shown). The cutting blade may be suspended above the ground at the end of a rotatable shaft (e.g., a drive shaft—again not shown in FIG. 1) that may be turned responsive to operation of an engine 30, such as a gasoline powered engine. Operation of the engine 30 may be initiated by a recoil starter via pulling of a recoil starter handle 32 by the operator. However, in other embodiments, the engine 30 may alternatively be started via a key, switch or other similar device.

The lawn mower 10 may include a mobility assembly on which a substantial portion of the weight of the lawn mower 10 may rest, when the lawn mower 10 is stationary. The mobility assembly may also provide for movement of the lawn mower 10. In some cases, the mobility assembly may be driven via power from the engine 30 that may be selectively provided to either or both of front wheels 40 and back wheels 42, which make up the mobility assembly.

In some examples, the front wheels 40 and/or the back wheels 42 may be adjustable in their respective heights. Adjusting the height of the front wheels 40 and/or the back wheels 42 may be employed in order to provide a level cut and/or to adjust the height of the cutting blade. In some embodiments, a local wheel height adjuster 44 may be provided at the front wheels 40 and/or the back wheels 42. However, in other embodiments, remote wheel height adjustment may also or alternatively be possible.

Rotation of the cutting blade may generate grass clippings, and/or other debris that may be ejected from the blade housing 20. In some cases, the clippings/debris may be ejected from a side or rear of the blade housing 20. When rear discharge is employed, many such lawn mowers may employ a bagging attachment 50 to collect discharged clippings/debris. However, bagging attachments may also be used for side discharge models in some cases. The bagging attachment 50 may be removable to enable the operator to empty the bagging attachment 50.

In an example embodiment, the lawn mower 10 may further include a handle assembly. The handle assembly of FIG. 1 may include two handle members 60 that extend generally rearward and upward from opposing sides of a rear portion of the blade housing 20. The handle members 60 may be substantially parallel to each other and may be connected to each other at their distal ends via a cross bar 62. The handle members 60 may be adjustable in length or may be foldable to reduce the amount of space that the lawn mower 10 consumes when stored or shipped.

In some embodiments, various controls may be provided proximate to the cross bar 62 and/or one or more of the handle members 60. For example, the pictured embodiment shows a trigger controller 70 and a presence bar 72. When the presence bar 72 is held proximate to the cross bar 62, power may be enabled to be delivered to either or both of the front wheels 40 and the back wheels 42 via a drive system of an example embodiment. The trigger controller 70 may be used to provide for remote actuation of various control functions. For example, pulling either or both of the movable members of the trigger controller 70 may cause adjustments to be made to one or more transmissions of the lawn mower 10 or may cause movement of components to actuate shifting from no drive operation (e.g., zero-wheel drive where movement is only responsive to operator pushing) to an all wheel drive configuration as described in greater detail below. As such, the trigger controller 70 provides one example of a remote actuator, or actuation mechanism, that may be employed to practice an example embodiment. In some cases, however, the trigger controller 70 may be replaced by a lever, knob, or other actuation device that may be operably coupled to a speed change gear, one or more transmissions or linkages associated therewith, and/or one or more idler pulleys or linkages associated therewith.

Figure 2:
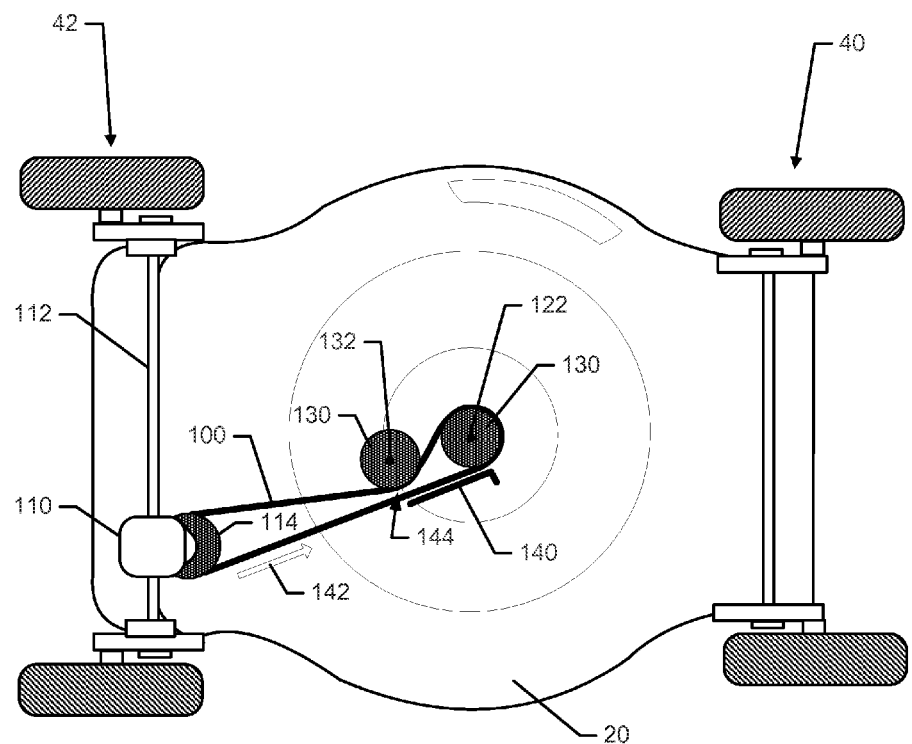
FIG. 2 illustrates a view of portions of a drive system of the lawn mower from below the blade housing of an example embodiment.
Figure 3:
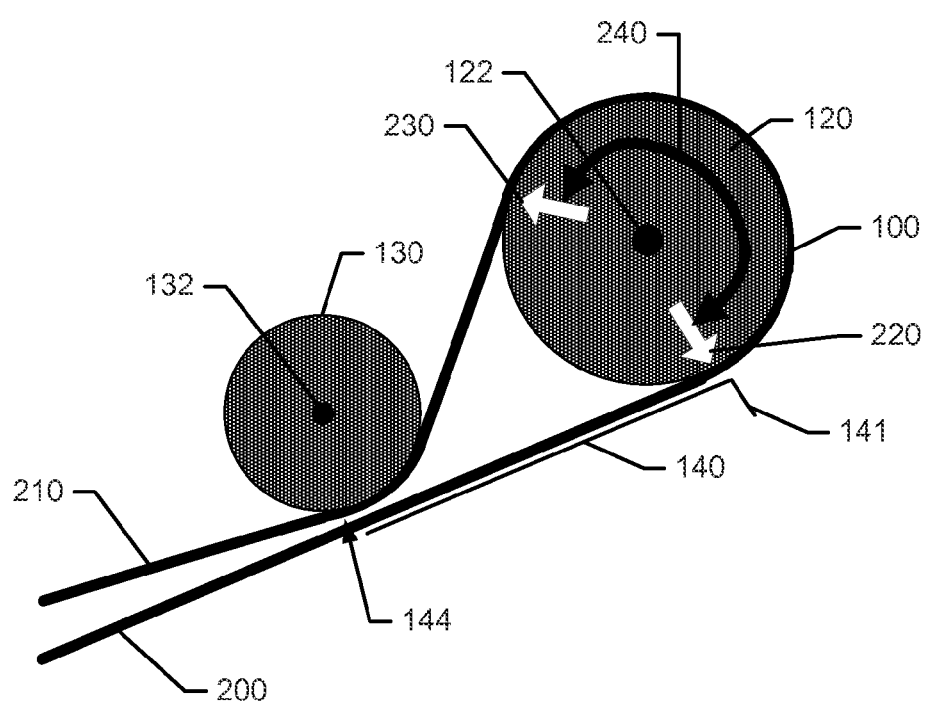
FIG. 3 illustrates a closer view of components of the drive system with the transmission engaged according to an example embodiment.
Figure 4:
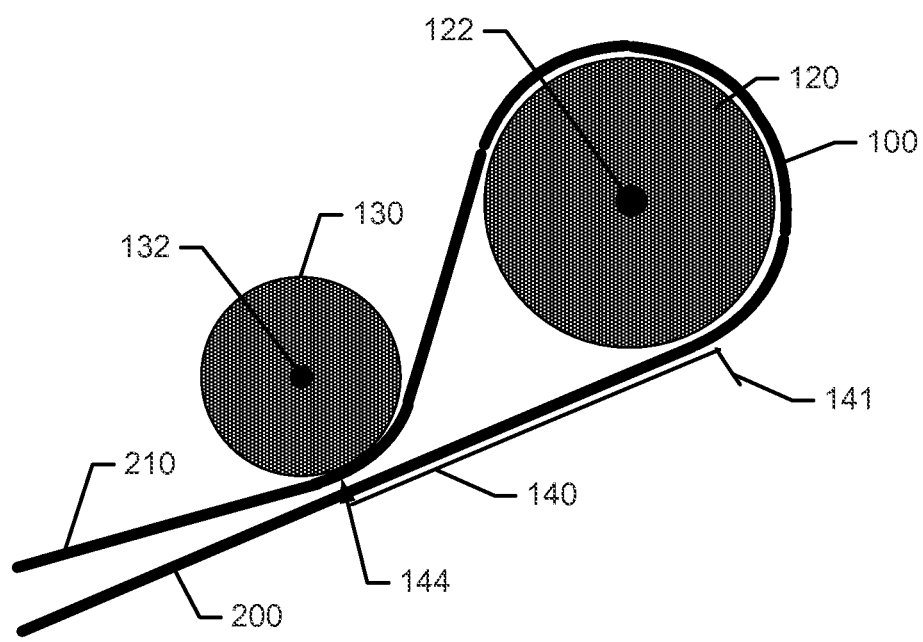
FIG. 4 illustrates a closer view of components of the drive system with the transmission disengaged according to an example embodiment.

In an example embodiment, the remote actuator (e.g., the trigger controller 70) may be configured to provide a single actuator enabled to shift the lawn mower 10 between all wheel drive operation and another drive mode (e.g., in either direction). Some example embodiments may accomplish the above-described functionality with a single drive belt, while other example embodiments may employ two drive belts. FIGS. 2-4 illustrate an example employing a single drive belt system in which the back wheels 42 are selectively powered. However, it should be appreciated that alternative embodiments may provide power to the front wheels 40, or two drive systems may be provided such that one drive system powers the front wheels 40 and the other drive system powers the back wheels 42.

FIG. 2 illustrates a view from below the blade housing 20 of an example embodiment. In other words, FIG. 2 is a view from below ground level looking up into the under side of the blade housing 20 with protective coverings for the drive system removed to view components of a drive system according to an example embodiment. As shown in FIG. 2, the drive system may include a single drive belt 100 that may be routed to a rocking transmission 110, which may be operably coupled via axle 112 to selectively provide power to turn the back wheels 42 when the rocking transmission 110 is engaged. The rocking transmission 110 may include a drive pulley 114 that is capable of engaging the drive belt 100 when there is sufficient tension (or lack of slack) between the drive belt 100 and the drive pulley 114. In this regard, for example, when the rocking transmission 110 rocks around the axis defined by the axle 112 toward the drive shaft or, in this case, the front wheels 40, the drive pulley 114 is also moved toward the drive shaft and slack may be created to reduce tension of the drive belt 100. However, when the rocking transmission 110 rocks around the axis away from the drive shaft or, in this case, the front wheels 40, the drive pulley 114 is also moved away from the drive shaft and the belt tension on the drive belt 100 may be increased so that the drive belt 100 engages the drive pulley 114. The rocking transmission 110 may include a gear box coupled to the drive pulley 114 and the axle 112 to convert rotational motion in the drive pulley 114 into rotational motion in the axle 112. In one embodiment, the drive pulley's axis of rotation is fixed relative to the gear box of the rocking transmission 110 so that both the gear box and the drive pulley 114 rotate together about the axle 112 to engage and disengage the belt 100. In an alternative embodiment, the axis of rotation of the drive pulley 114 moves relative to the gear box (e.g., the drive pulley 114 rotates about the axle 112 and the gear box does not) to engage and disengage the belt 100. In an example embodiment, the amount of tension (or slack) between the drive pulley 114 and the drive belt 100 may be adjusted remotely by operation of the trigger 70 or other type of remote actuator.

The drive belt 100 may be operably (directly or indirectly) coupled to a drive shaft that turns a blade (not shown) for cutting grass. For example, the drive shaft may rotate responsive to operation of the engine 30 and turn a drive shaft pulley 120 (or engine pulley) that may be operably coupled to the drive shaft. The rotation of the drive shaft pulley 120 may cause corresponding movement of the drive belt 100 via engagement between the drive shaft pulley 120 and the drive belt 100 based on tension maintained between the drive shaft pulley 120 and the drive belt 100. The movement of the drive belt 100 may thereafter be selectively transferred to the rocking transmission 110 via the drive pulley 114.

In an example embodiment, at least one idler pulley 130 may be disposed proximate to the drive shaft pulley 120 in order to assist in providing tension between the drive belt 100 and the drive shaft pulley 120 and to provide for a desired alignment of the drive belt 100 as it engages the drive shaft pulley 120. Thus, for example, the drive belt 100, the drive pulley 114, the drive shaft pulley 120 and the idler pulley 130 may form the drive system of example embodiments.

In relation to provision of the desired alignment of the drive belt 100, the idler pulley 130 may be disposed at least partially in between the drive shaft pulley 120 and the drive pulley 114. Moreover, the idler pulley 130 may be disposed to increase the amount of belt wrap around the drive shaft pulley 120. In this regard, the idler pulley 130 may be disposed such that an axis of rotation 132 of the idler pulley 130 is fixed relative to an axis of rotation 122 of the drive shaft pulley 120 and disposed in a range of about 2.5 to about 3.5 inches away from the axis of rotation 122 of the drive shaft pulley 120. For example, in one embodiment, the drive shaft pulley 120 has a diameter of approximately 2.28 inches, idler pulley 130 has a diameter of approximately 1.75 inches, and the axis of rotation 132 of the idler pulley 130 is approximately 2.86 inches from the axis of rotation 122 of the drive shaft pulley 120. While the drive shaft pulley 120 and the drive pulley 114 may each be disposed within the circumference of the drive belt 100, the idler pulley 130 may be disposed outside of the circumference of the drive belt 100 in such a way as to push one of the belt runs between the drive pulley 114 and the drive shaft pulley 120 toward the other belt run between the drive pulley 114 and the drive shaft pulley 120.

In an example embodiment, a belt keeper 140 may be provided to facilitate keeping the drive belt 100 properly aligned and prevent the drive belt 100 from slipping off of the pulleys of the system. The belt keeper 140 may be a metal, plastic or other rigid material formed to present a plate-like guard structure to keep the drive belt 100 properly aligned relative to the drive shaft pulley 120 and the idler pulley 120. In an example embodiment a bracket may be affixed to a portion of the blade housing 20 to support the belt keeper 140 as the belt keeper 140 extends proximate to the drive belt 100. The belt keeper 140 of one example embodiment may be provided to extend both parallel and proximate to a first belt run (e.g., a supplying belt run) extending between the drive pulley 114 and the drive shaft pulley 120. In other words, the belt keeper 140 of some embodiments may be disposed close to and substantially parallel with the belt run that, based on the direction of rotation of the pulleys, provides drive belt to the drive shaft pulley 120. Arrow 142 (disposed proximate to the supplying belt run) illustrates the direction of movement of the drive belt 100 in one example embodiment. Meanwhile, the idler pulley 130 may impinge on a second belt run (e.g., a returning belt run) that returns belt from the drive shaft pulley 120 to the drive pulley 114 to push the returning belt run closer to the supplying belt run. In an example embodiment, a gap 144 may be defined between the returning belt run and the supplying belt run. The gap 144 when the drive system is engaged (i.e., when there is no slack in the belt 100) may be provided to be less than one belt thickness in length and, in some cases, the gap 144 may be defined proximate to a portion of the drive belt 100 that lies between one end of the belt keeper 140 and the idler pulley 130. An imaginary line from the axis of rotation 132 of the idler pulley 130 and the end of the belt keeper 140 may be substantially perpendicular to the direction of extension of the belt keeper 140.

By pushing one belt run toward the other, the placement of the idler pulley 130 may provide for increased belt wrap around the drive shaft pulley 120 and the drive pulley 114. In a conventional structure that does not include the idler pulley 130, the belt runs between the drive shaft pulley 120 and the drive pulley 114 may proceed directly between the pulleys. In a situation in which the drive shaft pulley 120 and the drive pulley 114 are about the same diameter, the belt wrap would be expected to be about 180 degrees around each pulley. However, if one pulley is slightly larger than the other, then the belt wrap around the larger pulley may be expected to be slightly greater than 180 degrees, and the belt wrap around the smaller pulley may be expected to be slightly less than 180 degrees. If it is assumed, for example, that the drive pulley 114 has a slightly larger diameter than the drive shaft pulley 120, then the belt wrap around the drive shaft pulley 120 will be expected to be less than 180 degrees and the belt wrap around the drive pulley 114 may be expected to be slightly more than 180 degrees.

The placement of the idler pulley 130 substantially between the drive pulley 114 and the drive shaft pulley 120 in a manner that draws the belt runs between the drive pulley 114 and the drive shaft pulley 120 closer together increases the belt wrap around the drive shaft pulley 120 and the drive pulley 114. The placement of the idler pulley 130 such that the axis of rotation 132 is closer to the axis of rotation 122 of the drive shaft pulley 120 than the axis of rotation of the drive pulley 114 may result in both the drive pulley 114 and the drive shaft pulley 120 having belt wrap greater than 180 degrees or even 190 degrees, but results in the belt wrap of the drive shaft pulley 120 being greater than the belt wrap in the drive pulley 114. For example, the placement of the idler pulley 130 such that the axis of rotation 132 is between 2.5 to 3.5 inches from the axis of rotation 122 of the drive shaft pulley 120, may cause the belt wrap around the drive pulley 114 to be greater than or equal to about 190 degrees and may cause the belt wrap around the drive shaft pulley 120 to be greater than or equal to about 200 degrees. For example, in some embodiments, the belt wrap around the drive pulley 114 may be approximately 192 degrees, or elsewhere in the range of 190 degrees to 220 degrees, and the belt wrap around the drive shaft pulley 120 may be approximately 218 degrees, or elsewhere in the range of 200 degrees to 230 degrees. However, it should be appreciated that even more belt wrap could be achieved, if desired. In some cases, the relative sizes of the pulleys may also impact the degree of belt wrap that is achievable, as well as the distance between pulleys and the size of the mower (e.g., the distance between the drive shaft and the axles). As such, it should be noted that the relative sizes of the idler pulley 130, the drive pulley 114 and the drive shaft pulley 120 may vary in different embodiments. Thus, a variety of suitable sizes may be selected to achieve desired performance characteristics. The example embodiments described herein may provide for improved power transfer, ease of drive system engagement and disengagement, and belt ballooning (described below) compared to conventional drive systems.

Increasing belt wrap to greater than 190 degrees on the drive pulley 114 and greater than 200 degrees on the drive shaft pulley 120 increases the contact surface area between the drive belt 100 and the drive pulley 114 and the drive shaft pulley 120, thus providing better engagement or coupling between the drive belt 100 and the respective pulleys. As a result, the added belt wrap increases the drive power to the back wheels 42 (or whichever wheels receive power in alternative embodiments). Moreover, the increased drive power is provided with reduced control effort. In other words, an operator attempting to activate the transmission using the trigger 70 will feel less tension in the trigger 70. In embodiments in which cable length of the cable providing operable coupling between the trigger 70 and the rocking transmission 110, there may also be less need to adjust cable length.

FIG. 3 provides a closer view of the idler pulley 130 and the drive shaft pulley 120 of an example embodiment. As shown in FIG. 3, supplying belt run 200 may extend substantially parallel to the belt keeper 140 and wrap around the drive shaft pulley 120 more than 200 degrees before the returning belt run 210 heads back to the drive pulley 114 (not shown in FIG. 3). The idler pulley 120 is disposed substantially between the drive pulley 114 and the drive shaft pulley 120 to push the returning belt run 210 toward the supplying belt run 200 to define the gap 144. The supplying belt run 200 comes into contact with the drive shaft pulley 120 at about a point at a periphery of the drive shaft pulley 120 that is indicated by arrow 220. The drive belt 100 then extends around the drive shaft pulley 120 in contact therewith to about the point indicated at arrow 230. The amount of belt wrap where there is contact between the drive belt 100 and the drive shaft pulley 120 is greater than 200 degrees and is indicated by the arc 240.

The belt keeper 140 extends substantially parallel to the supplying belt run 200 over a distance about as long as the distance between the axis of rotation 132 of the idler pulley 130 and the axis of rotation 122 of the drive shaft pulley 120. Accordingly, in one example embodiment, the belt keeper 140 may extend such that a line between the axis of rotation 132 of the idler pulley 130 and one end of the belt keeper 140 and is substantially perpendicular to the direction of extension of the belt keeper 140 and a line between the axis of rotation 122 of the drive shaft pulley 120 and the opposite end of the belt keeper 140 is also substantially perpendicular to the direction of extension of the belt keeper 140. Accordingly, a length of the belt keeper 140 may be about the same as the distance between the axis of rotation 132 of the idler pulley 130 and the axis of rotation 122 of the drive shaft pulley 120 (e.g., about 2.5 inches to about 3.5 inches in one embodiment). One end of the belt keeper may include an extension 141 that may make it more difficult for the drive belt 100 to slip over the belt keeper 140.

The idler pulley 130 may act as a belt keeper relative to the returning belt run 210. Moreover, the combination of the belt keeper 140 and the idler pulley 130 defining the gap 144 between the supplying belt run 200 and the returning belt run of less than the thickness of the belt may ensure that the drive belt 100 cannot escape or slip out of the area defined between the belt keeper 140 and the idler pulley 130. Furthermore, when the rocking transmission 110 is disengaged so that the drive belt 100 is enabled to go slack, the drive belt 100 portion that is on the drive shaft pulley 120 side of the idler pulley 130 will largely remain on that side of the idler pulley 130. Thus, as the rocking transmission 110 rotates, more drive belt 100 will be pushed through the gap 144 and the drive belt 100 will be caused to "balloon" or expand out of contact with (or at least relieving tension with) the drive shaft pulley 120. In other words, pushing drive belt 100 through the gap 144 formed between belt keeper 140 and the idler pulley 130 may cause the drive belt 100 to expand in belt wrap diameter at a location of the drive belt 100 proximate to the drive shaft pulley 120 and thereby disengage the drive shaft pulley 120 from the drive belt 100. Meanwhile, the drive pulley 114 may also disengage from the drive belt 100. In some embodiments, the drive pulley 114 may have a keeper fixed relative to the pulley's axis of rotation and disposed on the side of the drive pulley 114 opposite the drive shaft pulley 120, and the keeper may be configured to rotate about the axle 112 with the drive pulley 114 in order to keep belt 100 proximate to the drive pulley 114 and to help push the belt 100 toward the drive shaft pulley 120.

FIG. 4 illustrates an example of a "ballooned" drive belt 100 (e.g., a drive belt having a larger belt wrap diameter than the diameter of the drive shaft pulley 120). The relatively small gap 144, coupled with the fact that the opposite end of the belt keeper 140 ends proximate to the drive shaft pulley 120, causes the drive belt 100 to be pushed away from contact with the drive shaft pulley 120 relatively quickly after the rocking transmission 110 is operated. The positioning of the idler pulley 130 distant from the rocking transmission 110 (e.g., with the idler pulley 130 being spaced apart from the drive shaft pulley 120 by a distance that is less than ¼ of the distance between the drive pulley 114 and the drive shaft pulley 120) also makes drive relatively easy to modulate and provides for a clean and quick disengagement of the pulleys from the drive belt 100. This quick disengagement of the drive shaft pulley 120 causes relatively fast and complete disengagement of the transmission to the drive shaft. Accordingly, the wheels can more easily accommodate rearward motion after disengagement without concern relative to coupling some belt motion to the transmission while the back wheels 42 are moving in reverse. The potential for damage to the transmission can therefore be reduced. Furthermore, friction between the belt 100 and the drive shaft pulley 120 when the drive system is disengaged may be reduced and belt life may be prolonged.

Accordingly, an example embodiment may provide a lawn mower and corresponding drive system for the lawn mower. The lawn mower may include a blade housing, an engine supported at least in part by the blade housing to selectively rotate a drive shaft, a mobility assembly and a drive system. The drive system may include a drive belt, a drive pulley, a drive shaft pulley and an idler pulley. The drive pulley may be disposed at a rocking transmission of the lawn mower to transfer drive belt motion to power for a set of wheels of the lawn mower via the rocking transmission when the rocking transmission is engaged. The drive shaft pulley may be operably coupled to a drive shaft of the lawn mower to rotate responsive to rotation of the drive shaft. The drive shaft pulley may engage the drive belt responsive to engagement of the rocking transmission. The idler pulley may be disposed substantially between the drive pulley and the drive shaft pulley to engage the drive belt and result in belt wrap around the drive shaft pulley of greater than about 200 degrees and result in belt wrap around the drive pulley of greater than about 190 degrees.

In an example embodiment, the lawn mower and/or drive system may include additional, optional features, and/or the features described above may be modified or augmented. Some examples of modifications, optional features and augmentations are described below. In this regard, for example, in some cases, (1) a distance between an axis of rotation of the drive shaft pulley and an axis of rotation of the idler pulley may be about 2.5 inches to about 3.5 inches. Alternatively or additionally, (2) the idler pulley may be spaced apart from the drive shaft pulley by a distance that may be less than ¼ a distance between the drive shaft pulley and the drive pulley. Alternatively or additionally, (3) a distance between an axis of rotation of the drive shaft pulley and an axis of rotation of the idler pulley may be about 2.5 inches to about 3.5 inches. Alternatively or additionally, (4) the idler pulley may be disposed to push a first belt run of the drive belt extending between the drive pulley and the drive shaft pulley toward a second belt run of the drive belt extending between the drive shaft pulley and the drive pulley to form a gap between the first and second belt runs. In some embodiments, (5), the gap may have a length that is less than a thickness of the drive belt. In an example embodiment, (6) the gap may be formed proximate to a belt keeper disposed to extend substantially parallel to the second belt run. In some cases, (7) the idler pulley may be disposed such that a line extending between an axis of rotation of the idler pulley and an end of the belt keeper lies substantially perpendicular to a direction of extension of the belt keeper. In some embodiments, (8) a line extending from an axis of rotation of the drive shaft pulley to an end of the belt keeper may extend substantially perpendicular to a direction of extension of the belt keeper.

In some embodiments, any or all of (1) to (8) may be employed and the belt keeper may have a length of about 2.5 to about 3.5 inches. In an example embodiment, any or all of (1) to (8) may be employed and the belt keeper comprises an extension extending away from the drive shaft pulley at an end of the belt keeper proximate to the drive shaft pulley. In some cases, any or all of (1) to (8) may be employed and rotation of the rocking transmission to disengage the rocking transmission pushes the drive belt toward the drive shaft pulley, and wherein the belt keeper and the idler pulley combine to cause the drive belt to expand in belt wrap diameter at a location of the drive belt proximate to the drive shaft pulley and thereby disengage the drive shaft pulley from the drive belt. In some embodiments, any or all of (1) to (8) may be employed and the drive belt may be rotated such that the second belt run provides drive belt to the drive shaft pulley and the first belt run returns drive belt from the drive shaft pulley to the drive pulley via the idler pulley. In an example embodiment, any or all of (1) to (8) may be employed and the rocking transmission may be engaged and disengaged via a remote actuator at an operator station of the lawn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A lawn mower comprising:
a blade housing;
an engine supported at least in part by the blade housing and configured to rotate a drive shaft;
a mobility assembly selectively operably coupled to the engine to provide mobility of the lawn mower responsive at least in part to operation of the engine, wherein the mobility assembly comprises a first set of wheels and second set of wheels; and
a rocking transmission operably coupled to the first set of wheels to provide drive power to the first set of wheels via a drive system responsive to engagement of the rocking transmission,
wherein the drive system comprises:
a drive belt;
a drive pulley disposed at the rocking transmission to transfer drive belt motion to power for the first set of wheels via the rocking transmission when the rocking transmission is in an engaged position;
a drive shaft pulley operably coupled to the drive shaft to rotate responsive to rotation of the drive shaft, the drive shaft pulley engaging the drive belt responsive to the rocking transmission being in the engaged position; and
an idler pulley disposed substantially between the drive pulley and the drive shaft pulley and configured to engage the drive belt when the rocking transmission is in the engaged position, such that a belt wrap around the drive shaft pulley is greater than about 200 degrees and a belt wrap around the drive pulley is greater than about 190 degrees,
wherein the rocking transmission is configured to rotate relative to an axle corresponding to the first set of wheels between the engaged position and the disengaged position, wherein rotation of the rocking transmission to the engaged position causes tension to be applied to the drive belt and rotation of the transmission to the disengaged position releases the tension on the drive belt.

2. The lawn mower of claim 1, wherein a distance between an axis of rotation of the drive shaft pulley and an axis of rotation of the idler pulley is about 2.5 inches to about 3.5 inches.

3. The lawn mower of claim 1, wherein the idler pulley is spaced apart from the drive shaft pulley by a distance that is less than ¼ a distance between the drive shaft pulley and the drive pulley.

4. The lawn mower of claim 1, wherein the idler pulley is disposed to push a first belt run of the drive belt extending between the drive pulley and the drive shaft pulley toward a second belt run of the drive belt extending between the drive shaft pulley and the drive pulley to form a gap between the first and second belt runs.

5. The lawn mower of claim 4, wherein the gap has a length that is less than a thickness of the drive belt.

6. The lawn mower of claim 5, wherein the gap is formed proximate to a belt keeper disposed to extend substantially parallel to the second belt run.

7. The lawn mower of claim 6, wherein the idler pulley is disposed such that a line extending between an axis of rotation of the idler pulley and an end of the belt keeper lies substantially perpendicular to a direction of extension of the belt keeper.

8. The lawn mower of claim 6, wherein a line extending from an axis of rotation of the drive shaft pulley to an end of the belt keeper extends substantially perpendicular to a direction of extension of the belt keeper.

9. The lawn mower of claim 6, wherein the belt keeper has a length of about 2.5 to about 3.5 inches.

10. The lawn mower of claim 6, wherein the belt keeper comprises an extension extending away from the drive shaft pulley at an end of the belt keeper proximate to the drive shaft pulley.

11. The lawn mower of claim 6, wherein rotation of the rocking transmission to the disengaged position pushes the drive belt toward the drive shaft pulley, and wherein the belt keeper and the idler pulley combine to cause the drive belt to expand in belt wrap diameter at a location of the drive belt proximate to the drive shaft pulley and thereby disengage the drive shaft pulley from the drive belt.

12. The lawn mower of claim 4, wherein the drive belt is rotated such that the second belt run provides drive belt to the drive shaft pulley and the first belt run returns drive belt from the drive shaft pulley to the drive pulley via the idler pulley.

13. The lawn mower of claim 1, wherein the rocking transmission is rotated between the engaged position and disengaged position via a remote actuator.

14. The lawn mower of claim 1, wherein the drive belt has belt wrap around the drive shaft pulley of less than about 230 degrees and belt wrap around the drive pulley of less than about 220 degrees.

15. The lawn mower of claim 1, wherein the drive belt has belt wrap around the drive shaft pulley of substantially about 218 degrees and belt wrap around the drive pulley of substantially about 192 degrees.

16. A drive system of a lawn mower, the drive system comprising:
   a drive belt;
   a drive pulley disposed at a rocking transmission of the lawn mower to transfer drive belt motion to power for a set of wheels of the lawn mower via the rocking transmission when the rocking transmission is in an engaged position;
   a drive shaft pulley operably coupled to a drive shaft of the lawn mower to rotate responsive to rotation of the drive shaft, the drive shaft pulley engaging the drive belt responsive to the rocking transmission being in the engaged position; and
   an idler pulley disposed substantially between the drive pulley and the drive shaft pulley and configured to engage the drive belt when the rocking transmission is in the engaged position, such that a belt wrap around the drive shaft pulley is greater than about 200 degrees and a belt wrap around the drive pulley is greater than about 190 degrees,
   wherein the rocking transmission is configured to rotate relative to an axle corresponding to the set of wheels between the engaged position and the disengaged position, wherein rotation of the rocking transmission to the engaged position causes tension to be applied to the drive belt and rotation of the transmission to the disengaged position releases the tension on the drive belt.

17. The drive system of claim 16, wherein a distance between an axis of rotation of the drive shaft pulley and an axis of rotation of the idler pulley is about 2.5 inches to about 3.5 inches.

18. The drive system of claim 16, wherein the idler pulley is spaced apart from the drive shaft pulley by a distance that is less than ¼ a distance between the drive shaft pulley and the drive pulley.

19. The drive system of claim 16, wherein the idler pulley is disposed to push a first belt run of the drive belt extending between the drive pulley and the drive shaft pulley toward a second belt run of the drive belt extending between the drive shaft pulley and the drive pulley to form a gap between the first and second belt runs.

20. The drive system of claim 19, wherein the gap has a length that is less than a thickness of the drive belt.

\* \* \* \* \*